United States Patent [19]
Ross et al.

[11] Patent Number: 5,454,238
[45] Date of Patent: Oct. 3, 1995

[54] ANTI-THEFT APPARATUS FOR MOTOR VEHICLE STEERING COLUMN

[75] Inventors: Christian E. Ross, Freeland; Douglas M. Schneider, Bridgeport, both of Mich.

[73] Assignee: General Motors Corporation, Detroit, Mich.

[21] Appl. No.: 280,236

[22] Filed: Jul. 25, 1994

[51] Int. Cl.$^6$ ................................. B60R 25/02
[52] U.S. Cl. ........................ 70/186; 70/210; 70/252; 74/89.15
[58] Field of Search .................... 70/210, 251, 252, 70/183–186, 245–248, 237; 74/89.15; 180/287

[56] References Cited

U.S. PATENT DOCUMENTS

| | | | |
|---|---|---|---|
| 2,904,987 | 9/1959 | Panico | 70/252 |
| 3,490,255 | 1/1970 | Wight et al. | 70/252 |
| 4,638,882 | 1/1987 | Sato | 180/287 |
| 4,643,009 | 2/1987 | Sato | 70/252 |
| 5,016,454 | 5/1991 | Al-Sheikh | 180/287 X |
| 5,052,509 | 10/1991 | Dzioba | 180/287 |

FOREIGN PATENT DOCUMENTS

| | | | |
|---|---|---|---|
| 0402938 | 12/1990 | European Pat. Off. | 70/252 |
| 0014553 | 1/1984 | Japan | 180/287 |

Primary Examiner—Lloyd A. Gall
Attorney, Agent, or Firm—Saul Schwartz

[57] ABSTRACT

A modular anti-theft apparatus for mounting on a core or generic steering column having a tubular mast jacket, a steering shaft in the mast jacket, a steering shaft bearing support housing attached to an upper end of the mast jacket, a platform on the bearing support housing for attachment of accessory modules, and a peripherally notched lock plate rigidly attached to the steering shaft. The anti-theft apparatus includes a case bolted onto the bearing support housing on the platform thereon, a bolt carrier mounted on the case for back and forth bodily movement, a lock bolt mounted on the carrier for bodily movement as a unit therewith and for bodily movement relative thereto, a reversible electric motor in the case, and a gear reduction drive between the motor and the bolt carrier. The operation of the electric motor is synchronized with an ignition switch lock remote from the steering column.

3 Claims, 2 Drawing Sheets

ANTI-THEFT APPARATUS FOR MOTOR VEHICLE STEERING COLUMN

Recently, a modular steering column assembly has been proposed in which a generic or core steering column, useable in many vehicle models, is customized for an individual application by bolt-on style attachment of various modularized components. In a modularized anti-theft apparatus for the core steering column, for example, the aforesaid coincidental lock consisting of a cylinder lock, a lock bolt, a rack connected to the bolt, and a pinion connected to a rotatable barrel of the cylinder lock is contained in a case adapted to be bolted to the core steering column on a platform thereof. A modularized anti-theft apparatus according to this invention is an improvement over the aforesaid modularized coincidental lock anti-theft apparatus and over the anti-theft apparatus described in the aforesaid U.S. Pat. No. 4,643,009.

SUMMARY OF THE INVENTION

This invention is a new and improved modular anti-theft apparatus for a modular steering column assembly including a core or generic steering column having a tubular mast jacket, a steering shaft in the mast jacket, a steering shaft bearing support housing attached to an upper end of the mast jacket, a platform on the bearing support housing for attachment of accessory modules, and a peripherally notched lock plate rigidly attached to the steering shaft in a plane perpendicular to the longitudinal centerline thereof. The anti-theft apparatus according to this invention includes a case adapted for bolt-on style attachment to the bearing support housing on the platform thereon, a carrier mounted on the case for back and forth bodily movement parallel to the longitudinal centerline of the steering shaft, a lock bolt mounted on the carrier for bodily movement relative thereto and spring biased against a stop on the carrier, a reversible electric motor in the case, and a gear reduction drive in the case between the motor and the carrier operative to bodily shift the carrier in a first direction toward an extended position when an armature shaft of the motor rotates in a first direction and toward a retracted position when the armature shaft rotates in an opposite second direction. In the extended position of the carrier, the lock bolt protrudes into a notch in the lock plate to immobilize the steering shaft. In the retracted position of the carrier, the lock bolt is withdrawn from the lock plate. If the lock bolt is blocked by the lock plate before the extended position of the carrier is achieved, the spring accommodates relative movement between the carrier and the lock bolt and projects the bolt into a notch in the lock plate when a notch next achieves registry with the lock bolt.

DESCRIPTION OF THE PREFERRED EMBODIMENT

Figure 1:
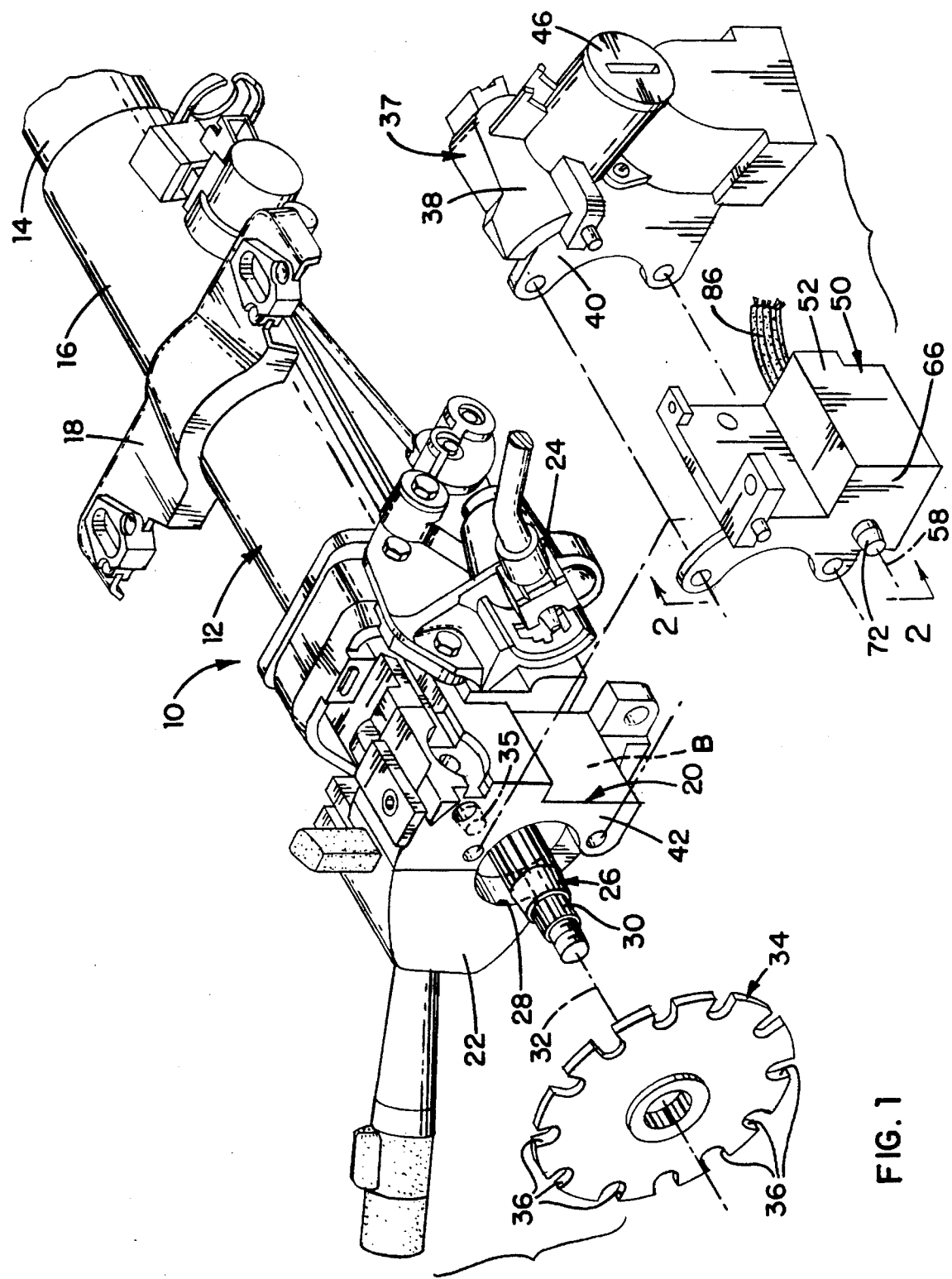
FIG. 1 is a fragmentary, exploded perspective view of a modular steering column assembly for a motor vehicle showing a core steering column of the assembly and a modularized anti-theft apparatus according to this invention replacing a heretofore known modularized anti-theft apparatus.

As seen best in FIG. 1, a core or generic steering column 10 of a modular steering column assembly for a motor vehicle includes a tubular mast jacket 12 having a lower tube 14 adapted for anchorage on a front panel, not shown, of the passenger compartment of the vehicle and an upper tube 16 telescoped over the lower tube and releasably attached to instrument panel support structure, not shown, through a bracket 18. An energy absorber, not shown, such as described in U.S. Pat. No. 3,392,599, issued 16 Jul. 1968 and assigned to the assignee of this invention, is disposed in the overlap between the upper and lower tubes 16, 14 and absorbs energy during a collapse stroke of the steering column after the bracket 18 releases from the instrument panel support structure.

A bearing support housing 20 is attached to an upper end of the upper tube 16 of the mast jacket 12 and includes a plurality of platforms on which may be mounted different modularized accessories such as a turn signal and emergency warning flasher module 22 and a transmission selector lever module 24. A steering shaft 26 of the modular steering column assembly is disposed in the mast jacket 12 and in a passage 28 through the bearing support housing and has an upper end 30 protruding beyond the bearing support housing. A bearing, B on the bearing support housing engages the steering shaft 26 near the upper end thereof and cooperates with a bearing, not shown, between the steering shaft and the lower tube 14 in supporting the steering shaft for rotation about a centerline 32 of the generic steering column. A steering wheel, not shown, is rigidly attached to the upper end 30 of the steering shaft 26.

A first portion of a coincidental lock of the type described above is mounted on the bearing support housing 20 and includes a disc-shaped lock plate 34 and a schematically represented lock bolt 35. The lock plate is rigidly attached to the steering shaft 26 in a plane perpendicular to the centerline 32 between the steering wheel and the bearing support housing and includes a plurality of outwardly opening notches 36. The lock bolt 35 is supported on the bearing support housing for back and forth bodily movement parallel to the centerline 32.

A heretofore known modularized anti-theft apparatus 37 includes a case 38 having a flat yoke portion 40 adapted for seating engagement on a platform 42 on the bearing support housing 20 and for bolt-on style rigid attachment thereto. The case 38 has mounted thereon a second portion of the aforesaid coincidental lock including a rotatable barrel 46 of a cylinder lock. When a key is inserted in the barrel 46 and turned, a pinion, not shown, on the barrel engages a rack, not shown, on the bearing support housing 20 connected to the bolt 35 and shifts the bolt between an extended position projecting into an aligned one of the notches 36 in the lock plate 34 and a retracted position remote from the lock plate. A modularized anti-theft apparatus 50 according to this invention may be substituted for the heretofore known modularized anti-theft apparatus 37.

Figure 2:
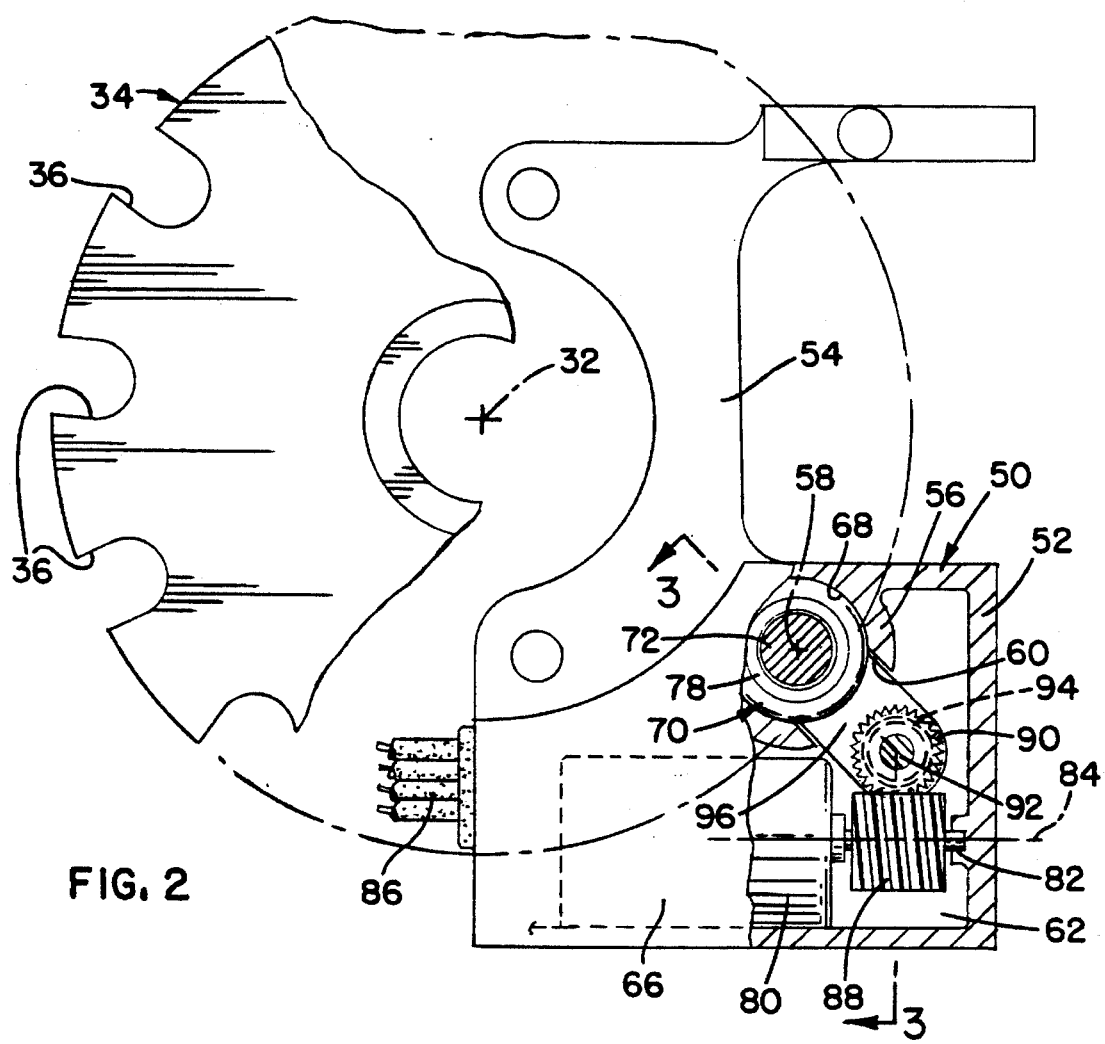
FIG. 2 is a partially broken-away view taken generally along the plane indicated by lines 2—2 in FIG. 1.
Figure 3:
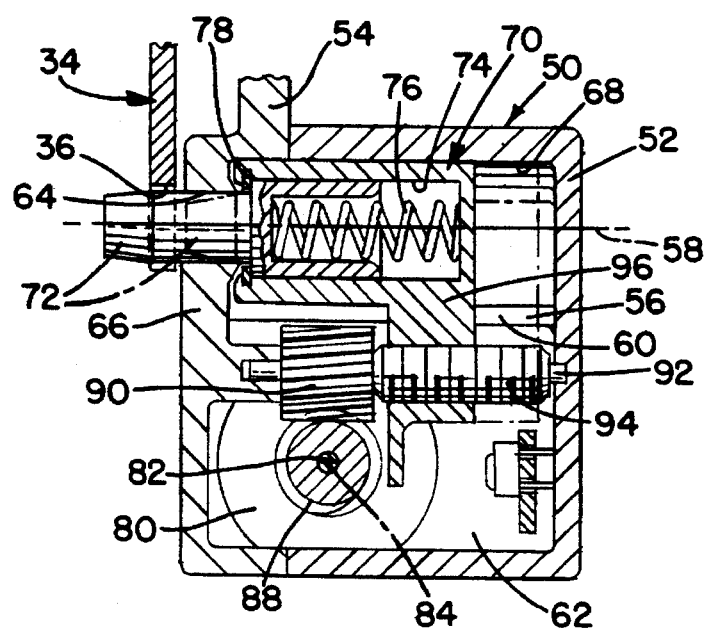
FIG. 3 is a sectional view taken generally along the plane indicated by lines 3—3 in FIG. 2.

Referring to FIGS. 1–3, the anti-theft apparatus 50 includes a case 52 having a flat yoke portion 54 adapted for seating engagement on the platform 42 on the bearing support housing 20 and for bolt-on style rigid attachment thereto. An internal tubular boss 56 of the case 52 is aligned on an axis 58 of the case and has a slot 60 therein, FIG. 2, through which the space within the tubular boss is exposed to a central chamber 62 of the case. A bore 64 in an end wall 66 of the case 52 is aligned on the axis 58 and defines a reduced diameter extension of an inner surface 68 of the tubular boss.

A bolt carrier 70 of the anti-theft apparatus 50 is disposed in the tubular boss 56 for back and forth bodily movement in the direction of the axis 58 between an extended position, FIG. 3, generally abutting the end wall 66 of the case 52 and a retracted position, not shown, separated from the end wall. A cylindrical lock bolt 72 is supported in a bore 74 in the carrier 70 for back and forth bodily movement relative to the carrier in the direction of the axis 58. A spring 76 between the bolt 72 and the carrier 70 biases the bolt against a stop defined by a retaining ring 78 on the carrier.

When the yoke portion 54 of the case 52 is bolted to the bearing support housing 20 on the platform 42 thereof in place of the anti-theft apparatus 37 and the lock bolt 35, the axis 58 is parallel to the longitudinal centerline 32. In that circumstance, when the carrier 70 is in its extended position, the lock bolt 72 protrudes beyond the end wall 66 of the case into an aligned one of the notches 36 in the lock plate 34 to immobilize the steering shaft. When the carrier is in its retracted position, the lock bolt 72 is withdrawn into the bore 64 in the end wall 66 remote from the lock plate so that rotation of the steering shaft is unimpeded.

An electric motor 80 of the anti-theft apparatus 50 is mounted in the central chamber 62 of the case 52 and has an armature shaft 82 rotatable about an axis 84 perpendicular to and below the axis 58. A fragmentarily illustrated wiring harness 86, FIG. 1, is connected to the motor and to a key actuated ignition switch, not shown, remote from the steering column whereby on and off conditions of the motor are synchronized with conventional actuation of the ignition switch of the vehicle.

A worm gear 88 mounted on the armature shaft 82 meshes with a worm wheel 90 on a drive shaft 92 rotatably supported on the case 52 perpendicular to and above the armature shaft. A screw threaded barrel 94 of the drive shaft 92 is received in a screw threaded bore in an arm 96 of the bolt carrier 70 which protrudes through the slot 60 into the central chamber 62. Rotation of the drive shaft in opposite directions effects back and forth bodily movement of the bolt carrier between its extended and retracted positions. In the event that the lock bolt 72 encounters the lock plate 34 between the notches 36 thereof as the motor 80 drives the bolt carrier 70 toward its extended position, the spring 76 is compressed between the bolt and the carrier. When the steering shaft is thereafter rotated, the bolt 72 is thrust by the spring 76 into the first one of the notches 36 which achieves registry with the axis 58.

The anti-theft apparatus 50 accommodates remote location of a key actuated ignition switch of the vehicle whereas the heretofore known anti-theft apparatus 37 has the corresponding key actuated lock barrel 46 in the usual position on the steering column. The separation between the mechanical locking components and the key operated ignition switch lock characteristic of the anti-theft apparatus 50 according to this invention affords designers flexibility to locate the ignition switch lock in a more convenient location than on the steering column behind the steering wheel. In addition, the compact construction and efficient cooperation of elements of the anti-theft apparatus 50 promotes simple concealment inside a steering column bezel, not shown, and to economy of manufacture.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. In a generic steering column for a motor vehicle including a tubular mast jacket, a bearing support housing attached to an upper end of said mast jacket having a platform for bolt-on style attachment of any one of a plurality of modularized accessories, a steering shaft in said mast jacket, bearing means supporting said steering shaft on said bearing support housing for rotation about a centerline of said mast jacket, and a disc-shaped lock plate rigidly attached to said steering shaft adjacent said bearing support housing in a plane perpendicular to said centerline and including a plurality of notches in a peripheral edge of said lock plate, a modular anti-theft apparatus comprising:

a case adapted for bolt-on style attachment to said bearing support housing on said platform thereof, a bolt carrier, means mounting said bolt carrier on said case for bodily movement in the direction of an axis of said case parallel to a centerline of said steering shaft between an extended position and a retracted position, a lock bolt, means mounting said lock bolt on said bolt carrier for bodily movement relative thereto in the direction of said axis of said case between a first position against a bolt stop on said bolt carrier and a second position disengaged from said bolt stop, a spring means between said lock bolt and said bolt carrier biasing said lock bolt toward said first position thereof relative to said bolt carrier, said lock bolt protruding beyond said case into a notch on said lock plate in said extended position of said bolt carrier and said first position of said lock bolt relative to said bolt carrier and being remote from said lock plate in said retracted position of said bolt carrier and said first position of said lock bolt relative to said bolt carrier, an electric motor mounted on said case having an output shaft rotatable in a first direction and in an opposite second direction, and gear means between said electric motor and said bolt carrier operative to effect bodily movement of said bolt carrier between said extended and said retracted positions thereof when said motor output shaft rotates in said first and said second directions thereof.

2. The steering column modular anti-theft apparatus recited in claim 1 wherein said gear means between said electric motor and said bolt carrier operative to effect bodily movement of said bolt carrier between said extended and said retracted positions thereof includes:

a drive shaft rotatably supported on said case, means on said drive shaft defining an outside screw thread, and means on said bolt carrier defining a bore with an inside screw thread engaging said outside screw thread on said drive shaft.

3. The steering column modular anti-theft apparatus recited in claim 2 wherein said gear means between said electric motor and said bolt carrier operative to effect bodily movement of said bolt carrier between said extended and said retracted positions thereof includes:

means on said electric motor output shaft defining a worm shaft rotatable as a unit with said output shaft, and means on said drive shaft defining a worm wheel meshing with said worm shaft.

* * * * *